Jan. 11, 1966

R. E. HOVDA 3,229,287

MONOPULSE RECEIVING APPARATUS

Filed July 1, 1963

INVENTOR.
ROBERT E. HOVDA
BY
ATTORNEY

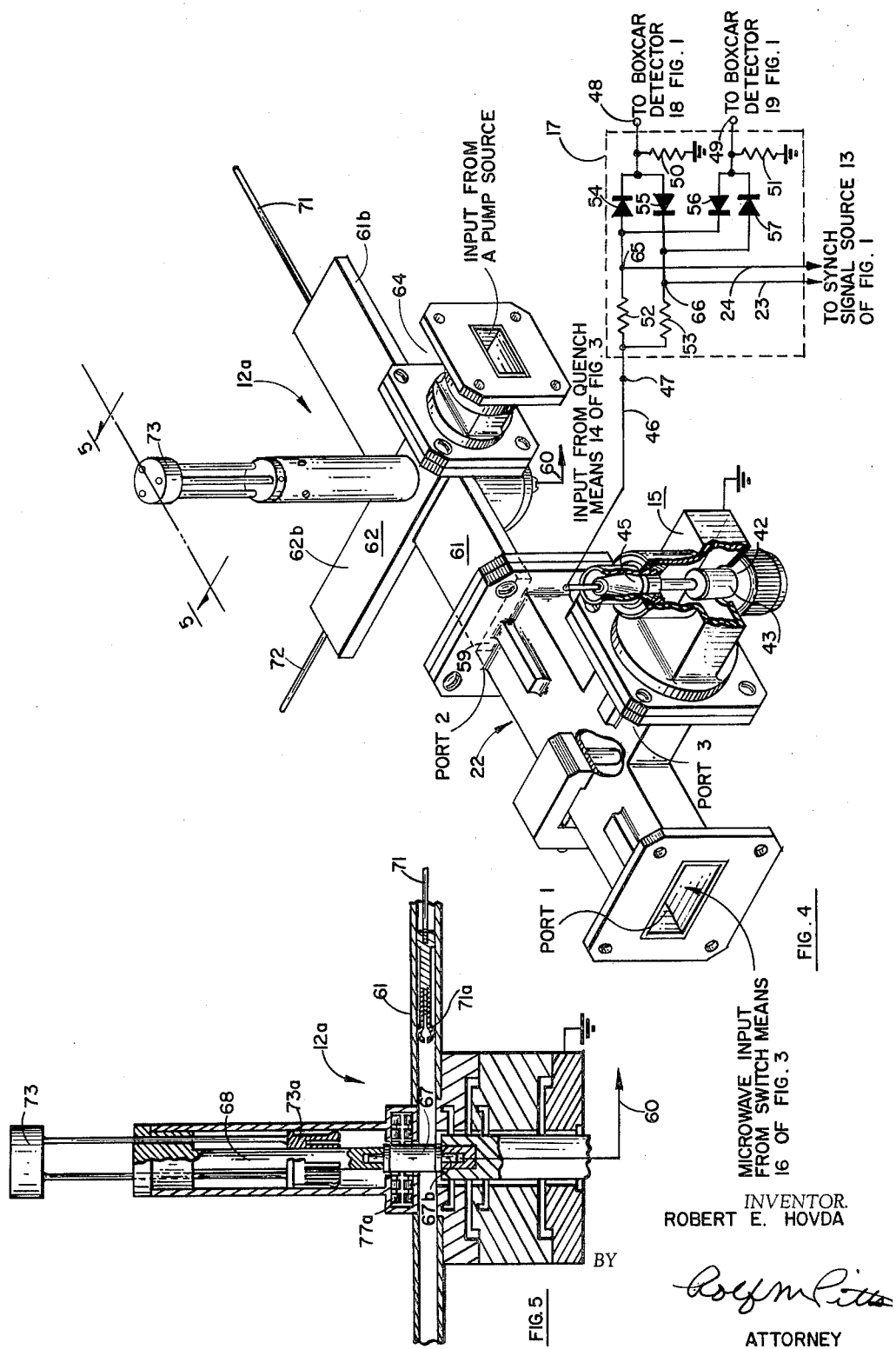

INVENTOR.
ROBERT E. HOVDA
BY
ATTORNEY

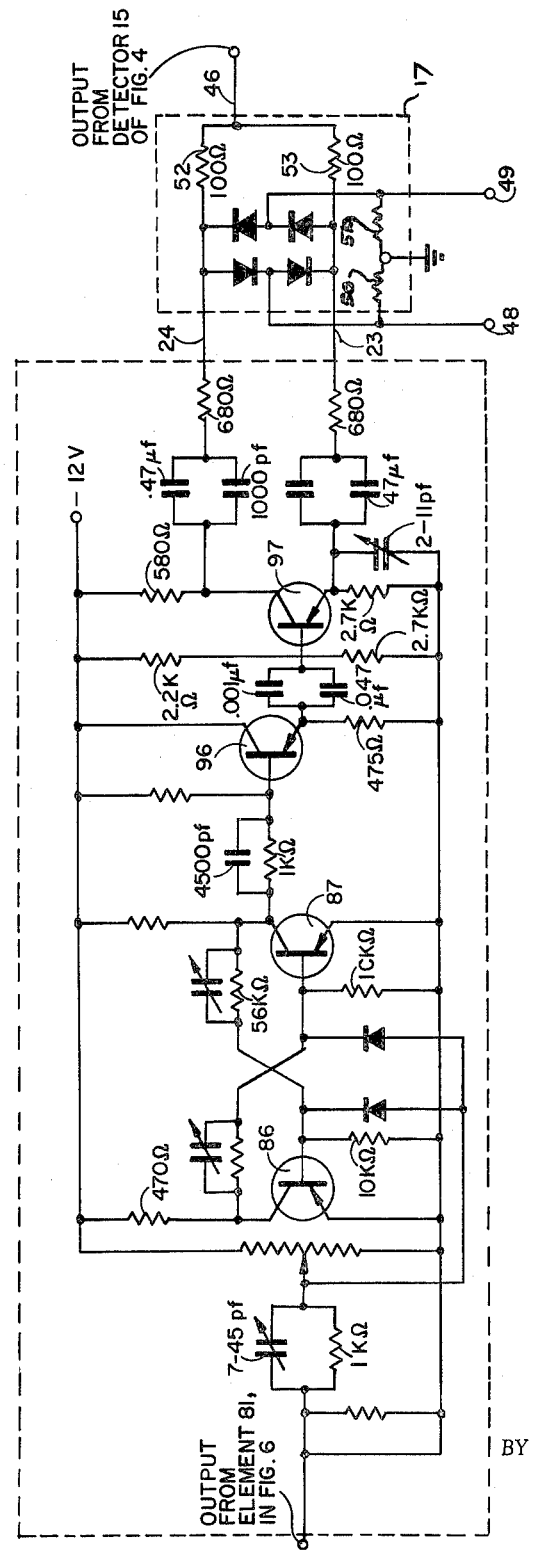

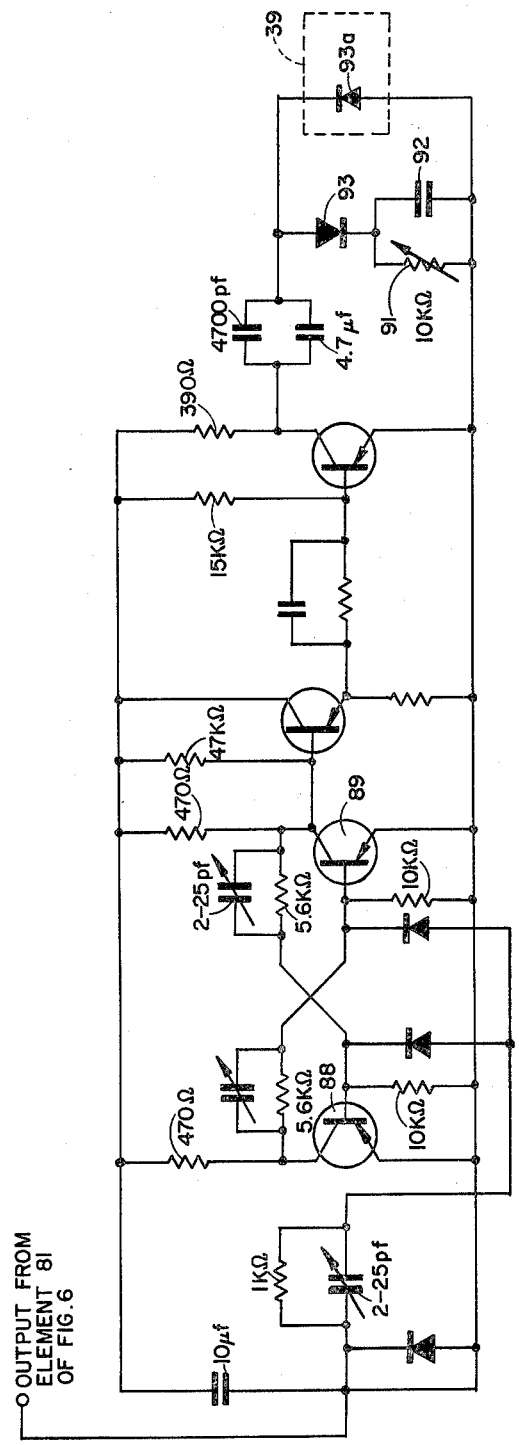

United States Patent Office 3,229,287
Patented Jan. 11, 1966

3,229,287
MONOPULSE RECEIVING APPARATUS
Robert E. Hovda, Yorba Linda, Calif., assignor to
North American Aviation, Inc.
Filed July 1, 1963, Ser. No. 291,612
6 Claims. (Cl. 343—16)

This invention relates to monopulse receiving systems, and more particularly to an improved monopulse receiver employing a minimum of signal translating apparatus.

In the design of monopulse receiving systems, there is provided a plurality of antenna apertures for providing at least two received signals indicative of a detected target. Signal processing of the received signal is employed to obtain a difference signal indicative of the angle-off-boresight of the detected target, measured in a direction determined by the relative displacement of the antenna apertures.

In the prior art of monopulse receiving systems, such signal processing has heretofore employed a multiplicity of complex equipments. For example, in a conventional monopulse receiving system such as the type decribed in U.S. Patent No. 2,948,982, issued to W. D. White on August 9, 1960, for a Precision Indicating Radar System, a magic "T" or microwave hybrid labyrinth or "rat race" is employed to obtain microwave signals indicative of the sum and difference respectively of two received signals. Also, the amplification of these signals to suitably usable signal levels have employed tuned IF amplifiers. Therefore, microwave mixers and an associated local oscillator have been required in order to reduce the frequency of the received microwave signals to a frequency region within which the IF amplifiers are adapted to respond. Further, because the high gain characteristic of such amplifiers relies upon careful tuning and adjustment to a given IF frequency, automatic frequency control (AFC) apparatus is required to drive the voltage-controlled local oscillator, whereby the combination of the AFC unit, local oscillator and mixer cooperate to vary the local oscillator frequency in response to variations in the received frequency, so as to maintain a constant IF frequency.

Moreover, in order to make such processed signals independent of target signal strength, a series of automatic gain control stages (AGC unit) have been required. In this way, a normalized difference signal was obtained which is more nearly indicative of target angle-off-boresight, and which is independent of target range on target size.

Further, a phase detector has been required in order to phase-detect the normalized difference signal relative to the sum signal, whereby a video signal may be obtained which is indicative of the sense of the angle-off-boresight (e.g., up versus down positions in an elevation plane) as well as indicative of the magnitude thereof.

Further, separate sum and difference signal amplifiers have been required for such signal processing, resulting in gain- and phase-tracking errors due to gain and phase differences existing between such separate amplifiers, and requiring constant maintenance and adjustment of such amplifiers. Hence, it is to be appreciated that such conventional, prior art monopulse receivers are complex, costly and of reduced reliability.

The concept of the subject invention is to provide improved monopulse receiving means requiring a minimum of functional components.

In a preferred embodiment of the subject invention, there is provided a monopulse system for receiving pulsed energy and having an antenna for providing two received signals indicative of a detected target. There is also provided microwave means for generating a signal indicative of the angle-off-boresight of the detected target, comprising amplifying means responsive to the received signals for providing output signals indicative of the logarithms of the amplitudes of the received signals. A microwave switch is operatively arranged for cyclically connecting alternate ones of the outputs of the antenna to the input of the amplifying means at a cyclical rate providing sampling periods equal to or less than one-half the pulsewidth of the transmitted pulsed energy. There is also provided a synchronous switch having a first and second output responsively connected to the amplifying means for providing a first and second output signal indicative of the logarithm of a respective one of the received signals, the synchronous switch being synchronized with the microwave switch. There is further provided means responsively connected to the synchronous switch for comparing the first and second output signals therefrom to provide a third signal indicative of the difference therebetween.

By means of the above described arrangement a single common amplifier is time-shared within the pulsewidth or time duration of received pulsed energy to amplify the several monopulse signals provided by a multi-aperture, or monopulse, receiving antenna. Therefore, the device is not subject to long term gain-tracking errors. The amplifier is operated in a logarithmic mode, whereby the amplitude difference between two received signals is indicative of the angle-off-boresight of a detected target. The use of a phase detector is thus eliminated; hence, the device is not subject to phase-tracking errors. In this way, a monopulse angle detection system is achieved which employs a minimum of signal-translating apparatus and which is not subject to gain and phase tracking errors.

Accordingly, it is an object of the subject invention to provide improved monopulse signal receiving means.

It is another object of the subject invention to provide monopulse signal translating means having improved gain and phase tracking characteristics.

It is still another object of the subject invention to provide monopulse signal translating means of minimum complexity and improved reliability.

It is a further object of the subject invention to provide time-shared means for the signal transport of a plurality of pulsed energy type signals.

These and other objects of the subject invention will become apparent from the following description taken together with the accompanying drawings in which:

FIGURE 4 is a partially torn away isometric drawing and a partial schematic of a preferred arrangement of a portion of the device of FIGURE 3;

FIGURE 5 is a partial vertical section of the device of FIGURE 4;

Figure 3:
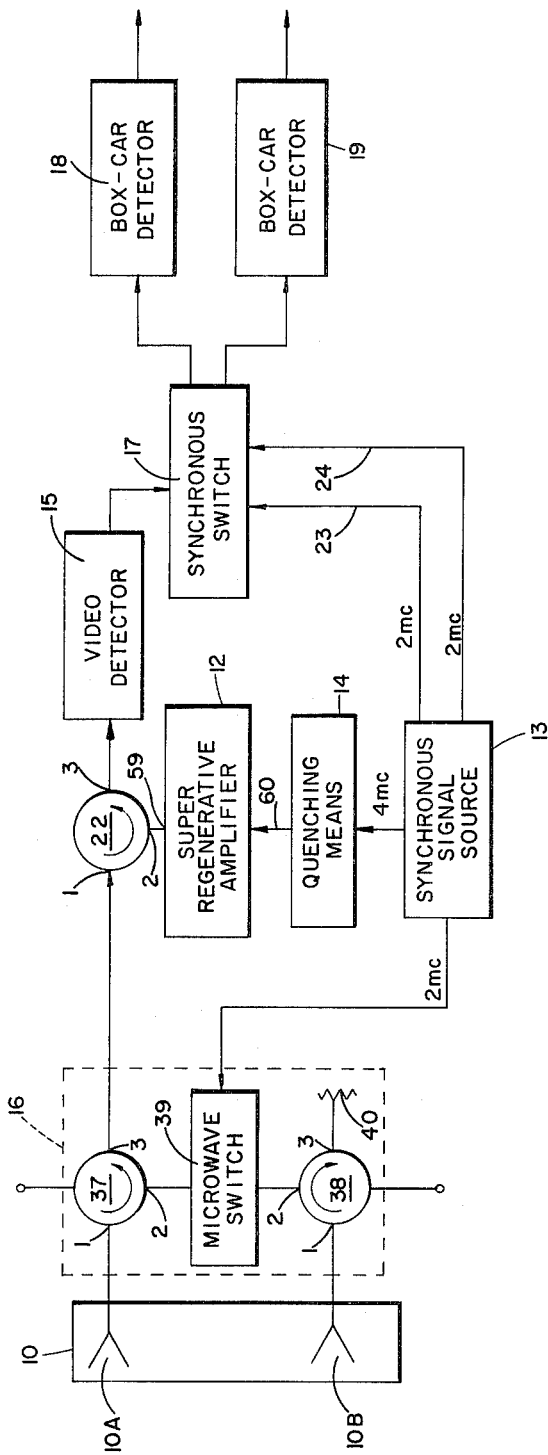
FIGURE 3 is a block diagram of an alternate embodiment of the invention.
Figure 6:
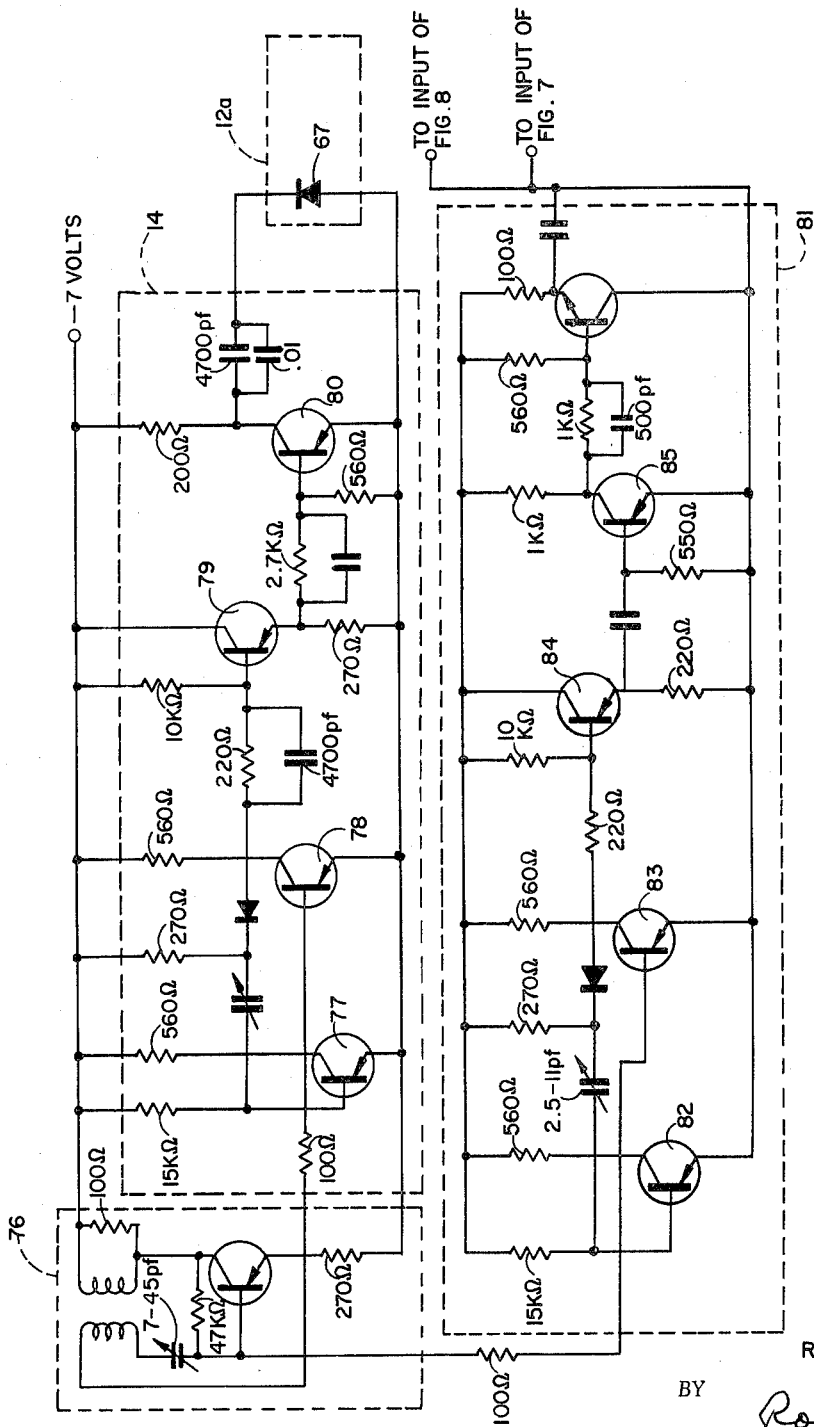

And FIGURES 6, 7 and 8 are schematic circuits comprising the synchronous signalling and quenching means of FIGURE 3.

Figure 1:
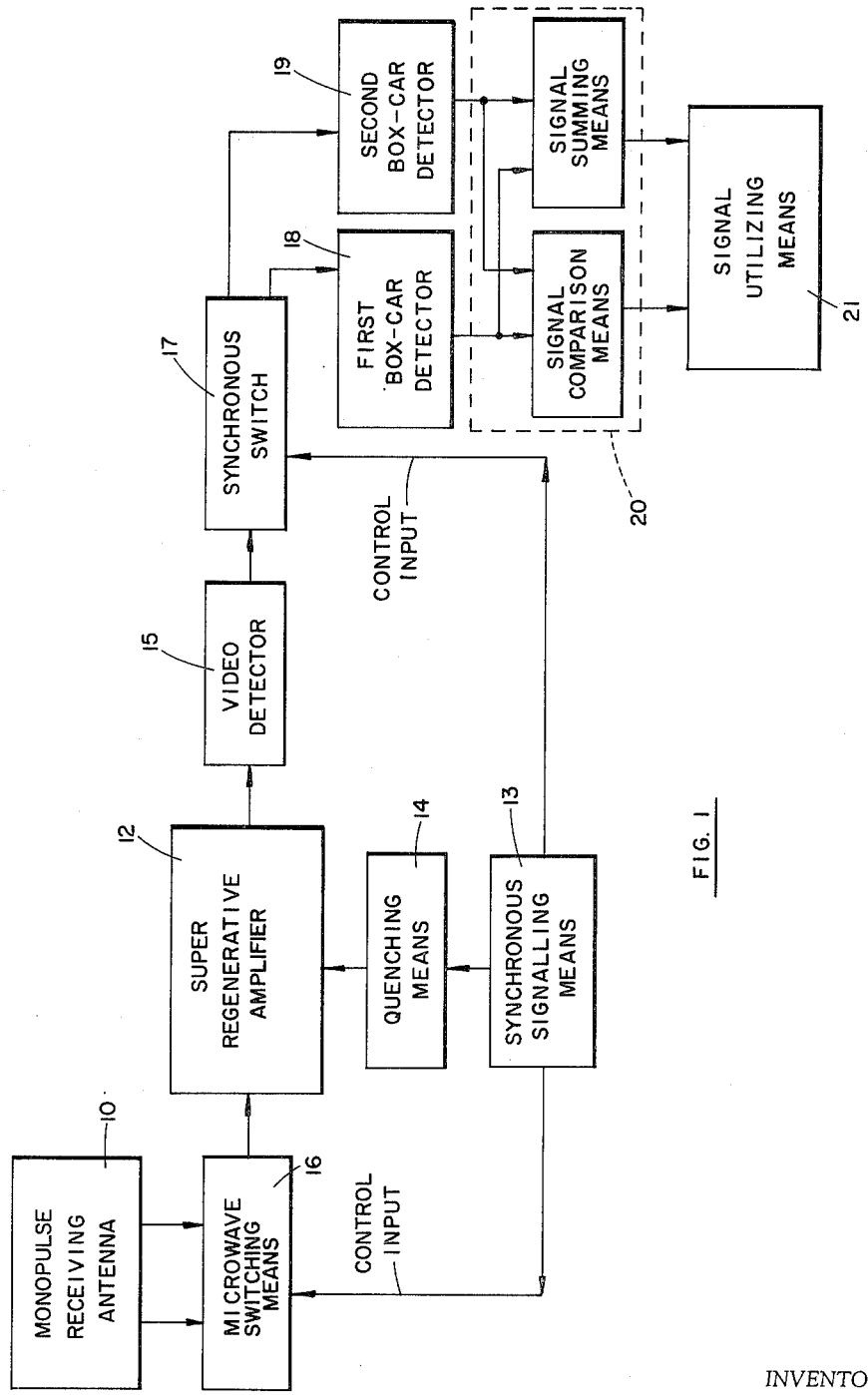
FIGURE 1 is a block diagram of a system embodying a concept of the invention.

Referring to FIGURE 1, there is illustrated a block diagram of a monopulse receiving system embodying a concept of the invention. There is provided a monopulse receiving antenna 10 having the usual apertures for providing a first and second received signal. The construction and arrangement of such antenna are well-known in the art; therefore antenna 10 is shown in block form only.

There is also provided logarithmic amplifying means responsive to the received signals for providing output signals indicative of the logarithms of the amplitudes of the received signals. Such amplifying means may be comprised of a super-regenerative amplifier 12 responsively coupled through switch 16 to antenna 10, and operatively connected to quenching means 14 for periodic quenching of super-regenerative amplifier 12.

The usual super-regenerative amplifier includes an oscillator element which is controlled to assume alternately an unstable or negatively damped oscillating condition and a highly damped or non-oscillating condition under the control of an alternating quench signal, as is well-known in the art. In other words, the state of the amplifier is switched at the frequency of the alternating quench signal. In the absence of an input signal, say, from antenna 10, the oscillations of amplifier 12 begin at a level determined by the noise level within the amplifier and die-out within each cycle of the quench signal. When a pulsed input signal which is larger than the internal noise level is applied from antenna 10, then such oscillations build up and reach a larger amplitude due to the larger initial condition and require a longer part of the quench cycle in which to subside. In other words, both the height and width of the amplitude output envelope from amplifier 12 increase as the amplitude of the pulsed input signal becomes larger, as is explained in U.S. Patent 3,054,056, issued September 11, 1962, to Yost, for a Super-Regenerative Circuit With Automatic Gain Control.

A regenerative amplifier may be operated in either a linear or logarithmic mode. In the logarithmic mode, a control bias is adjusted to achieve saturation of the intermittently quenched amplifier, whereby the output thereof (in response to pulsed inputs) is fixed in amplitude but has a pulsewidth indicative of the logarithm of the amplitude of the pulsed inputs applied thereto. Such logarithmic mode of operation is described in Monograph No. 3, at pages 6–12, being illustrated in FIG.2(d) at page 11 thereof, in volume I, of "Wheeler Monographs," by Wheeler, published by Wheeler Laboratories, Great Neck, New York (1953). The construction, arrangement and operation of an exemplary regenerative amplifier, including quenching means, are described in U.S. Patent 3,072,887, issued January 8, 1963, to R. Adler, for a Super-Regenerative Remote Control Receiver.

A super-regenerative amplifier is, in effect, a single tuned circuit in which the damping is cycled (by means of a quench driver), such damping being negative during part of each cycle to provide an extremely high gain during such interval. When the damping is heavily positive, signals in the tank circuit are quenched. Hence, the quench driver effects alternately a high gain response and response-quenching, to provide a high gain, sampled response. The quenching or damping of the tank circuit energy prevents "ringing" of the tank circuit after the cessation of the pulsed input signal so sampled.

When the damping becomes negative, the tank circuit becomes divergently oscillatory, increasing the amplitude envelope of the output response until a saturation level is reached. The area under the output amplitude envelope (as a function of time during saturation) increases approximately logarithmically with the amplitude or level of the input signal. Therefore, where the build-up time to saturation is minimal, a super-regenerative amplifier can be used as a logarithmic amplifier; and, consequently, will provide sampled output signals which are pulsewidth modulated as a logarithmic function of an input signal.

In the construction of an exemplary regenerative amplifier, inherently low positive damping (or high "Q") is best obtained by making the passive circuitry as lossless as possible and by inactivating the active element. High positive damping (or low "Q") can be obtained by shunting the tank circuit with a diode. Negative damping may be provided by means of an active device or circuit element connected as an oscillator (e.g., "pump").

Several devices useful for (microwave) super-regenerative amplifiers of pulsed microwave energy are reflex klystrons, two-cavity klystrons, magnetrons, and tunnel diodes. Also useful for pulsed microwave energy in the X-band (8.0 to 12.0 kilo-megacycles per second) are parametric amplifiers of the varicap diode or varactor type. Such devices require a pump source of microwave energy having a frequency of twice the carrier frequency of the signal to be amplified. However, such requirement provides an associated performance advantage or feature, in that such device is relatively free from transient-induced response because no D.-C. current flows in the active element. Further, the damping is conveniently controlled by the pump level or output energy level from the pump source.

The construction and arragement of parametric amplifiers of the varactor diode are described in the literature. See, for example, B. B. Bossard on "Super-Regenerative Reactance Amplifier," at page 1269, of Proceedings of IRE, July, 1959; and J. J. Younger et al., on "Parametric Amplifiers as Super-Regenerative Detectors," at page 1271, of Proceedings of IRE, July 1959.

Because such devices are known in the art, super-regenerative amplifier 12 is shown in block form only in FIGURE 1.

The quenching frequency of quenching means 14 is provided by synchronous signalling means 13, and is selected to have a periodicity which is equal to the sampled pulsewidth of the sampled pulsed energy signals to be translated, for reasons which will be more fully explained hereinafter. For example, for a radar system (including a time-shared receiver) employing a sampling period of one quarter microsecond, a quenching frequency of four megacycles per second (corresponding to a periodicity of one-fourth of a microsecond) might be employed. Such signalling means might comprise a squarewave generator circuit of the type described in figure 5.9, at page 155, of Pulse and Digital Circuits, by Newman and Taubs, published by McGraw-Hill (1956).

A video detector 15 is responsively connected to the output of amplifier 12 for directly providing a unipolar or video signal in response to the microwave output of amplifier 12. Such a detector is well-known in the art, and is therefore shown in block form only.

Interposed between the outputs of antenna 10 and the input to amplifier 12 is a microwave switch 16 operatively connected to synchronous signal means 13 for cyclically connecting alternate ones of the outputs of antenna 10 to the input of amplifier 12. The construction and arrangement of a preferred embodiment of microwave switch 16 is described in detail in copending U.S. patent application, Serial No. 281,973, filed May 21, 1963, by Arthur E. Cohen, assignor to North American Aviation, Inc., assignee of the subject invention.

Synchronous switching means 17 having a first and second output is responsively connected to video detector 15 for providing a first and second sampled output indicative of a respective one of the received signals from antenna 10. Such operation of synchronous switching means 17 is achieved by operatively connecting it to synchronous signalling means 13, whereby switch 17 is operated in synchronism with microwave switch 16. Switches 16 and 17 are operated by synchronous signalling means 13 at a frequency having a periodicity equal to or less than the pulsewidth of the received energy to be sampled. For example, in a radar system employing a transmitted pulsewidth of one microsecond, a switching frequency of two megacycles a second (corresponding to a periodicity of one-half microsecond) might be employed, whereby a sample period of one-quarter second is provided for each state of switches 16 and 17.

A first and second boxcar detector 18 and 19 is responsively connected to a corresponding output of synchronous switch 17 for providing an output signal having an amplitude indicative of the integral of the pulsed input applied thereto. Because the amplitude of the applied input is fixed, whereas the time-duration of the applied input is variable (being indicative of the logarithm of the amplitude of a pulsed input to amplifier 12), the boxcar detector provides an output having an amplitude indicative of the pulsewidth of the pulsed input applied thereto. In other words, the boxcar detector provides an output which is indicative of the logarithm of the amplitude of a corresponding one of the sampled received signals from antenna 10. The construction and arrangement of boxcar detectors 18 and 19 are well-known in the art, being described, for example, at pages 257 et seq. of "Threshold Signals" by James L. Lawson and George E. Ulenbeck (volume 24 of the MIT Radiation Laboratory Series), published by McGraw-Hill (1950). Accordingly, detectors 18 and 19 are shown in FIGURE 1 in block form only.

The outputs of boxcar detectors 18 and 19 may then be combined in a signal combining means 20 comprising a summing amplifier to provide a display signal for use by a display indicator or other signal utilizing means. Signal combining means 20 may further comprise a differential amplifier or like means for generating a signal indicative of the difference between the inputs thereto which difference signal is indicative of the angle-off-boresight of a detected target.

Figure 2:
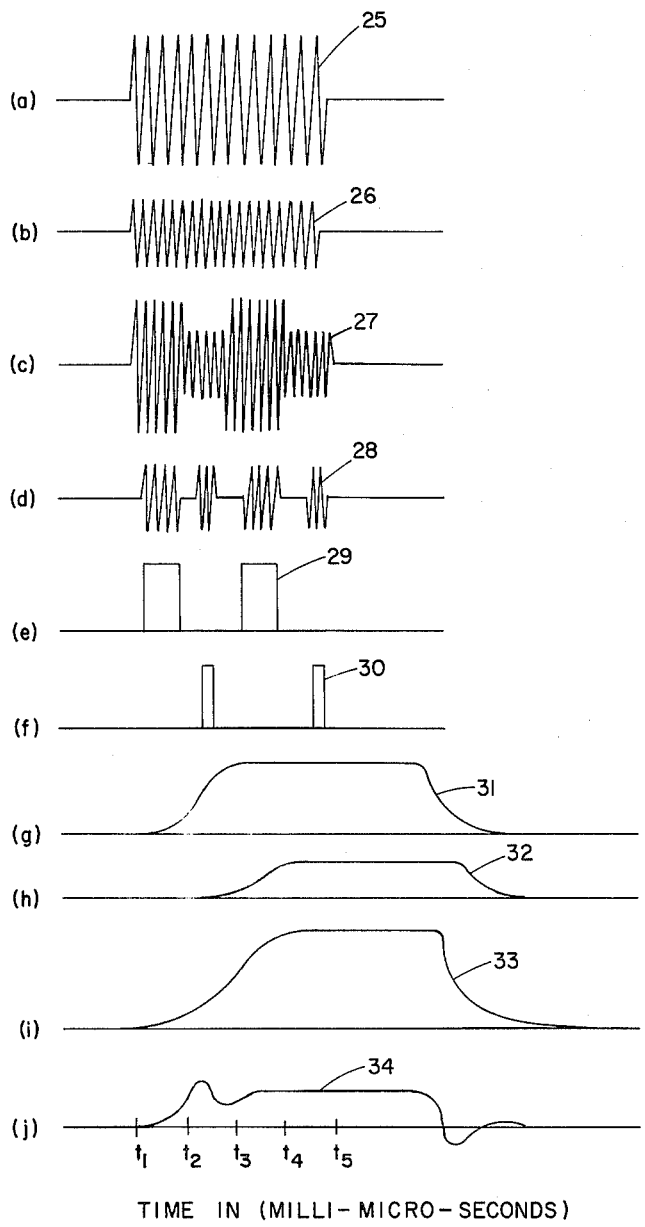
FIGURE 2 is a family of time histories illustrating the response of several elements of the device of FIGURE 1.

The normal operation of the above described device may be more easily understood by reference to FIGURE 2.

Referring to FIGURE 2, there is illustrated a family of time histories of the responses of several elements of the device of FIGURE 1. Curves 25 and 26 of FIGURE 2 represent a first and second received signal output, respectively, of microwave pulsed energy from antenna 10. (Such first and second signals may be those provided by two separate antenna apertures of the antenna 10.) The time duration or pulsewidth of such pulsed energy, in practice, is nominally about one microsecond. It is to be observed that a relative difference in amplitude exists between curves 25 and 26, indicating that the detected target causing such received signals is off the antenna boresight axis by some angle, and, as a consequence, one antenna aperture is receiving the signal more strongly than the other aperture.

Curve 27 represents the input to amplifier 12, which amplifier is alternately switched between the first and second outputs (curves 25 and 26 respectively) of antenna 10 by microwave switch 16 at a switching frequency provided by synchronous signalling means 13. Such frequency is observed in FIGURE 2 to provide an exemplary sampling period ($t_1$ to $t_2$) of one-fourth the pulsewidth ($t_1$ to $t_5$) of the pulsed energy received by antenna 10.

Curve 28 represents the output response of amplifying means 12 in response to the input described by curve 27 and in cooperation with synchronous signalling means 13. During the intervals, $t_1$ to $t_2$ and $t_3$ to $t_4$ amplifier 13 produces an output (curve 28) having a pulsewidth indicative of the logarithm of the amplitude of curve 25. During the intervals, $t_2$ to $t_3$ and $t_4$ to $t_5$, amplifier 12 produces an output (curve 28a) having a pulsewidth indicative of the logarithm of the amplitude of curve 26.

The output of amplifier 12 during the intervals from $t_1$ and $t_2$ and from $t_3$ to $t_4$ are detected by detector 15 and fed by synchronous switch 17 to first boxcar detector 18. The input to boxcar detector 18 is illustrated by curve 29 in FIGURE 2. The amplitude of the response of boxcar detector 18 to such input is indicative of the pulsewidth thereof, as is illustrated by curve 31.

Similarly, the output of amplifier 10 during the interval $t_2$ to $t_3$ and $t_4$ to $t_5$ are processed and fed as inputs to second boxcar detector 19, the inputs thereto and the corresponding outputs therefrom being illustrated by curves 30 and 32 respectively.

Hence, it is to be appreciated that the output signals from first and second detectors 18 and 19 of FIGURE 1 are indicative of the logarithms of the amplitudes of the first and second outputs respectively from antenna 10. These signals are then compared by signal comparison means to provide an output signal indicative of the difference between the logarithm of the two output signals from antenna, as shown by curve 34 in FIGURE 2. In this way, a signal is provided which is indicative of the amplitude and sense of the angle-off-boresight of a detected target. The boxcar response signals may also be combined to provide a detecting signal indicative of the sum thereto, as shown in curve 33.

It is to be further appreciated that such logarithmic signal translating means does not employ a phase detector, and is therefore not subject to phase errors due to phase shift performance difference between signal channels. Further, because a microwave regenerative amplifier is used which is directly responsive to the received microwave signals, tuned IF amplifier stages are not required. Further, because tuned IF amplifier stages are not employed, an automatic IF frequency control loop and associated voltage-controlled local oscillator, mixers, frequency discriminators and the like are not employed in the receiver. Moreover, because a signal common amplifier is employed, in the processing of the several monopulse signals, the device is not subject to gain tracking errors or differences in gain arising from the use of separate amplifiers for amplifying mutually exclusive ones of the several received monopulse signals.

Because the device is less subject to gain and phase tracking errors than conventional monopulse systems, it is to be appreciated that the device demonstrates improved boresight stability.

Although the concept of the invention has been described and illustrated in terms of a single plane monopulse receiver (such as one having two antenna apertures), it is clear that the principle of the invention is equally applicable to a dual plane monopulse receiver (such as one having four antenna apertures).

Accordingly, it is to be appreciated that improved and useful monopulse means has been described for generating a signal indicative of the angle-off-boresight of a detected target.

A preferred embodiment of the invention employing improved microwave switching means in cooperation with a one-port super-regenerative amplifier, is shown in FIGURE 3.

Referring to FIGURE 3, there is illustrated a block diagram of a preferred embodiment for the system of FIGURE 1. There is provided an antenna 10, super-regenerative amplifier 12, synchronous signal source 13, quenching means 14, video detector 15, microwave switching means 16, and synchronous switch 17 arranged to functionally cooperate essentially the same as like referenced elements of FIGURE 1. As illustrated in FIGURE 3, amplifier 12 is indicated as being a one-port (e.g., two-terminal) type, cooperating with switching means 16 and video detector 15 by means of a circulator 22 or similar nonreciprocal microwave translating means. A first port of circulator 22 is connected to the output of microwave switching means 16, the adjacent conductive or second port is connected to the output of one-port amplifier 12, and the third port is connected to video detector 15.

Synchronous switch 17 is responsively connected to two control input lines 23 and 24, which provide like synchronous switching signals of mutually opposite sense, for reasons which will be more fully explained hereinafter.

A preferred arrangement of amplifier 12, circulator 22, video detector 15 and synchronous switch 17 are shown in FIGURE 4. Accordingly, these elements are illustrated in FIGURE 3 in block form only. A preferred arrangement of microwave switching means 16 is illustrated for sampling alternate ones of the respective received signals provided by the corresponding apertures 10A and 10B of antenna 10. There are provided first and second circulators 37 and 38, each having at least three ports, the first port of circulator 37 and 38 being connected to a first and second aperture 10A and 10B respectively of antenna 10. A microwave switch 39 adapted to provide alternately transmissive and reflective states (in response to switching signals from source 13) interconnects the second ports of circulators 37 and 38. The third port of first circulator 37 is connected to the first or input port of circulator 22, and the third port of second circulator 38 is shorted by means for a microwave shorting impedance 40. The detail construction and arrangement of the elements of switch 16, and the manner of their cooperation in response to switching signals from source 13 is described in detail in the above referenced co-pending U.S. patent application.

In the cooperation of circulator 22 in the system of FIGURE 3, sampled microwave input from switching means 16 are transmitted from the first port of circulator 22 through the second port thereof to the one port of amplifier 12. The amplified sampled signals from microwave amplifier 12 are transmitted from the second port of microwave circulator 22 through the third port thereof to video detector 15. The video-detected, sample output of detector 15 is switched to an appropriate one of boxcar detectors 18 and 19 in synchronism with the sampling state of switching means 16, as was explained in connection with the cooperation of like referenced elements of FIGURE 1.

A preferred arrangement of elements 12, 14, 15, 17 and 22 is shown in FIGURE 4.

Referring to FIGURE 4, there is illustrated a preferred embodiment of the microwave detection arrangement shown in FIGURE 3. There is provided a three-port circulator 22 of the ferrite-type such as, for example, Model No. CS–405 manufactured by Rantec, Inc., of Calabasas, California; the first port of which is adapted to be connected to the microwave output from microwave switching means 16 of FIGURE 3. The second port of circulator 22 is connected to the port of a one-port parametric amplifier 12, and the third port to the microwave input of video detector 15.

Video detector 15 is comprised of a microwave section, including a crystal mount 42 of a commercially available type, such as either Model 611 or 536c manufactured by Microwave Association (Waveguide Systems Division), of Burlington, Massachusetts. Mounted within the waveguide section of crystal mount 42 is a crystal diode 43 such as type IN 23 manufactured, for example, by Microwave Associates, of Wesley, Massachusetts. Diode 43 is in electrical contact with the connector assembly 45 of crystal mount, whereby a D.-C. potential developed across the diode 43, in response to a microwave field existing across the waveguide section of crystal mount 42, may be connected by means of a co-axial line 46 to input terminal 47 of synchronous switch 17.

Synchronous switch 17 is essentially an electronic double throw switch, having a single input terminal 46 and first and second output terminals 48 and 49. There is provided a first and second output impedance 50 and 51 shunted across first and second output terminals 48 and 49 respectively to ground. There is also provided a first and second input impedance 52 and 53, each having one of its two terminals commonly connected to input terminal 47. There are further provided four diodes 54, 55, 56 and 57, comprising a first and second pair of oppositely-poled diodes. Diodes 54, 55, 56 and 57 are of a single common type suitable for high speed switching functions, such as type S555G manufactured by Transitron, Inc., of Wakefield, Massachusetts.

A first diode 54 of oppositely poled first pair 54 and 55 is connected between first output terminal 48 and the other terminal 65 of first input impedance 52; and a second diode 55 of diode pair 54 and 55 is connected between first output terminal 48 and the other terminal 66 of second input impedance 53. Similarly, a first diode 56 of oppositely-poled second pair 56 and 57 is connected between second output terminal 49 and the other terminal 65 of first input impedance 52; and the second diode 57 of diode pair 56 and 57 is connected between second output terminal 49 and the other terminal 66 of second input impedance 53. The oppositely-poled diodes of the two pairs (54 and 55) and (56 and 57) are so connected that first diodes 54 and 56 of the respective first and second pairs comprise a third oppositely-poled diode pair.

The respective second terminals 65 and 66 of first and second input impedances 52 and 53 are further connected to mutually synchronous bi-polar switching signals of opposite phase, provided by synchronous signal source 13 in FIGURE 2.

There is further provided in FIGURE 4 a logarithmic super-regenerative amplifier having a single common input-output port 59, operatively connected to the second port of circulator 22; and a quenching signal input terminal 60, connected to quenching means 16 of FIGURE 3. The super-regenerative amplifier of FIGURE 4 is comprised of a degenerate parametric amplifier 12a suitable for operation in the microwave region. As shown in FIGURE 4, parametric amplifier 12a is supplied with microwave energy from a pump source (not shown) having a frequency twice that of the microwave signals to be amplified. In this way, the subharmonic of the pump energy is effectively modulated by the input signal (of like frequency as the pump harmonic) applied to port 59 of amplifier 120, as is well understood in the parametric amplifier art. The structure and arrangement of a microwave source as a pump source being well-known in the art, and not constituting a novel aspect of the invention, an illustration thereof has been omitted for convenience only.

Amplifier 12a is quenced at a frequency twice that of the sampling rate of synchronous switches 16 and 17 (of FIGURE 3) by means of quenching signals applied from quenching means 14 of FIGURE 2. While each half-cycle of the switching frequency provides a sample input from one or the other of apertures A and B of antenna 10 in FIGURE 3, a full quenching cycle is required of amplifier 12a for each such sample (i.e., each sampling half-cycle), commencing in synchronism with the commencement of each sampled half-cycle. Accordingly, the quenching signals applied to parametric amplifier 12a are at twice the frequency of the switching signals applied to switch 17.

Hence, it is to be understood that the specific embodiment of amplifier 12a shown in FIGURE 4, employs a quenching frequency twice that of the sampling frequency of switch 17, and that the switching or sampling frequency represents a sampling period of no more than one-half the nominal pulsewidth of the pulsed microwave energy intended to be sampled and processed. Further, the pump frequency of parametric amplifier 12 is twice the carrier frequency of the microwave signals intended to be amplifed thereby.

As shown in FIGURE 4, parametric amplifier 12a (a partial vertical center section of which is shown in FIGURE 5) is constructed of two intersecting mutually-orthogonal horizontal waveguide sections 61 and 62 of reduced height. The top walls of each are mutually parallel, and the sections are separated in elevation at the point of intersection by a horizontal septum which is coplanar with both the top wall of the lower section 61 and the bottom wall of the top waveguide section 62, as may be more clearly seen in FIGURE 5. At the intersection of waveguide sections 61 and 62, a vertically extended cavity is provided.

Within that volume or portion of the vertical cavity defined by the intersection therewith by the two waveguide sections, is positioned a silicon Varactor 67 such as type MA 4343 manufactured by Microwave Associates (Semiconductor Division), Burlington, Massachusetts. The combined height of the reduced-height, stacked waveguide sections 61 and 62 is selected to accommodate the axial length of the reactive or ceramic portion of the Varactor 67.

In FIGURE 4, waveguide section 61 comprises the single input-output port of one-port amplifier 12a, being connected at its terminous to the second port of circulator 22. The opposite end 61b of waveguide section 61 contains a slidably adjusted slug (shown as element 71a in FIGURE 5), the axial position of which may be manually adjusted by means of rod 71. The purpose of such tuning slug is to adjust the input from circulator 22 to provide a maximum field effect across Varactor 67, as is well understood in the art.

Waveguide section 62 has a quarter-wave step or transition section 64 interposed between reduced-weight section 62 and a pump source (not shown) for impedance matching purposes, as is well understood in the art. The opposite end 62b of waveguide section 62 contains a slidably adjustable tuning slug (shown as element 72a in FIGURE 5) adjusted by rod 72. The purpose of such tuning slug is to maximize the field effect across diode 67 resulting from the pump source.

In the vertical cavity above diode 67 (FIGURE 5), is a tuning slug assembly, including a mounting rod 68 for mechanically securing and electrically grounding the upper terminal 67a of Varactor 67. The assembly also includes a tuning slug 73a externally concentric to mounting rod 68, and vertically slidable by means of knurled knob 73. The purpose of tuning slug 73a is to provide impedance matching of diode 67 to the cavity, including compensation for the effects of adjusting the tuning slugs in waveguide section 61 and 62. As a practical matter, it is necessary to adjust all three tuning slugs together, to obtain the best performance from amplifier 12a, because each of the three tuning adjustments somewhat affects the others.

The vertical section below diode 67 (FIGURE 5) contains a standard connector isolated from the waveguide assembly of amplifier 12a, for mechanically supporting and electrically connecting the second terminal 67b of diode 67 to quenching source 14 (of FIGURE 3). Such vertical section also defines a double choke section, one choke for each of the pump and idler (received input signal) frequencies, to prevent the leakage of such microwave energy therefrom along the connector to the quench-signal source, as is well understood in the microwave art.

As described above, switches 39 and 17 in FIGURE 3 are driven in synchronism by switching signals at a frequency having a periodicity no more than one-half the pulsewidth of the pulsed radar energy which the receiver is intended to receive; and regenerative amplifier 12 in FIGURE 3 is quenched by quenching signals at twice the switching frequency. An exemplary circuit providing such switching and quenching signals for processing pulsed energy having a pulsewidth of about one microsecond, is shown in FIGURES 6, 7, and 8.

Referring to FIGURES 6, 7, and 8 there is illustrated an exemplary embodiment of the synchronous signal source 13 and quenching means 14 of FIGURE 3. In FIGURE 6, there is provided a blocking oscillator 76 or like means for generating a four-megacycle signal. There is also provided quenching means 14 responsively connected to blocking oscillator 76 for providing signal shaping and power amplification of the four-megacycle signal. Transistors 77 and 78, as arranged in quenching means 14, cooperate in the manner of a monostable multivibrator to provide square-wave shaping of the four-megacycle signal, as is well understood in the art.

Transistors 79 and 80 in FIGURE 6 cooperate as power amplifiers to amplify the square-wave waveshape without waveshape distortion thereof (as is well understood in the art), in order to provide an effective quenching signal for amplifier 12 of FIGURE 3. This quenching signal is fed to diode 67 of the parametric amplifier 12a illustrated in FIGURES 4 and 5.

Also shown in FIGURE 6 is signal shaping means 81 responsively connected to blocking oscillator 76 for providing a source of impulse-shaped signals in synchronism with the quenching signal. Transistors 82, 83, 84 and 85 cooperate as shown to provide signal shaping such as peaking and unipolar clipping of the peaked signals. Such peaking is accomplished by square-wave shaping, and then differentiation, as is well understood in the art.

The impulse-shaped four-megacycle output from shaping means 81 is fed to frequency dividing means (shown in FIGURES 7 and 8) for the generation of switching signals.

Referring to FIGURE 7, there is illustrated an exemplary embodiment of frequency dividing means for providing two-megacycle square-wave switching signals in response to a four-megacycle impulse-shaped unipolar input. Transistors 86 and 87, as illustrated, cooperate as a bistable multivibrator to effect frequency division, as is well understood in the art. Transistors 96 and 97, as illustrated, cooperate as a split-load phase-inverter to provide two bipolar, two-megacycle signals of mutually opposite phase or sense, as is well understood in the art. These two switching signals are fed to mutually exclusive ones of input lines 23 and 24 of synchronous switch 17.

Referring now to FIGURE 8, there is illustrated an exemplary embodiment of frequency-dividing means for providing a two-megacycle square-wave switching signal to microwave switch 39 of FIGURE 3, in response to the four-megacycle impulse-shaped input from shaping means 81 of FIGURE 6. Transistors 88 and 89 cooperate in the manner of a bistable multivibrator to provide a two-megacycle square-wave output, as is well understood in the art. The connection of paralled variable resistor 91 and capacitor 92 in series with diode 93 across the output of FIGURE 8 is to provide means for adjusting the bias or operating point for the switch diode 39a of microwave switch 39, as required.

Hence, it will be seen that the device of this invention provides an improved monopulse radar system which employs a time-shared single channel receiver, and which avoids the use of tuned IF amplifier stages and associated AFC equipment. Also, the operation of the device as a logarithmic data processor avoids the use of phase-sensitive detectors, whereby phase-tracking errors are avoided. Further, such improved means effects a portion of the time-sharing operation and all of the single channel receiver amplification in the microwave stage, and effects direct video detection of the microwave signals thereby minimizing the electronic circuitry required. Moreover, the engineering economy of the minimal electronic cricuit function thus performed, permits efficient packaging of miniaturized circuitry which may be installed on the backside of the system antenna dish, to provide a system of minimum weight and volume.

Although the invention has been described and illustrated in detail, it is to be clearly understood that the same is by way of illustration and example only and is not to be taken by way of limitation, the spirit and scope of this invention being limited only by the terms of the appended claims.

I claim:
1. In a monopulse system for transmitting and receiving pulsed energy and having an antenna for providing two received signals indicative of a detected target, means for generating a signal indicative of the angle-off-boresight of said detected target comprising first synchronous switching means operatively connected for cyclically switching alternate ones of the outputs of said antenna to an output of said first switching means at a cyclically rate having a periodicity less than one-half the pulse width of said pulsed energy;

second synchronous switching means having a first and second output and operatively connected for cyclically connecting alternate ones of the outputs of said second switching means to the output of said first switching means for providing a first and second output signal indicative of a respective one of said received signals, said second synchronous switching means being synchronized with said first switching means;

logarithmic superregenerative microwave amplifying means intermittently quenched in synchronism with said synchronous switching means interposed between the output and input of said first and second synchronous switching means respectively for providing output signals indicative of the logarithms of said received signals;

and means for comparing said first and second output signals to provide a third signal quantitatively indicative of the angle-off-boresight of a detected target.

2. In a monopulse system for receiving pulsed energy and having an antenna for providing two received signals indicative of a detected target, means for generating a signal indicative of the angle-off-boresight of said detected target comprising logarithmic superregenerative microwave amplifying means responsive to said receive signals for providing output signals indicative of the logarithms of the amplitudes of said received signals;

a microwave switch operatively connected for cyclically connecting alternate ones of the outputs of said antenna to the input of said amplifying means at a cyclical rate having a periodicity less than one-half the pulsewidth of said pulsed energy;

quenching means for periodically quenching said amplifying means; and synchronous switching means having a first and second output and responsively connected to said amplifying means for providing a first and second output signal indicative of the logarithm of a respective one of said received signals, said switching means and said quenching means being synchronized with said microwave switch; and means for comparing said first and second output signals to provide a third signal indicative of the difference therebetween.

3. In a monopulse receiver of pulsed energy and having an antenna for providing two received signals indicative of a detected target, synchronous signal-translating means comprising super-regenerative microwave amplifying means responsive to said received signals for providing video-detected output signals having pulsewidths indicative of the amplitudes of said signals, a microwave switch operatively connected for cyclically connecting alternate ones of the outputs of said antenna to the input of said amplifying means at a cyclical rate having a periodicity less than one-half the pulsewidth of said pulsed energy, synchronous switching means responsively connected to said amplifying means and having a first and second output for providing a first and second output signal indicative of a respective one of said received signals, and means for periodically quenching said amplifying means, said synchronous switching means and said quenching means being synchronized with said microwave switch.

4. The device of claim 3 further including means for providing a signal indicative of the angle-off-boresight of said detected target, comprising means for comparing said first and second output signals to provide a third signal indicative of the difference therebetween, said super-regenerative means being operated in the logarithmic mode of operation.

5. The device of claim 3 further including first and second boxcar detector means responsively connected for providing detected signals having an amplitude indicative of the respective pulsewidth of said first and second output signals, and signal combining means for combining said detected signals to obtain a target angle signal indicative of the difference therebetween, said super-regenerative means being operated in the logarithmic mode of operation.

6. In a monopulse receiver of a pulsed radar system, the combination comprising first, second and third microwave circulators, each having at least three ports, the first ports of said first and second circulators being adapted for connection to a first and second aperture respectively of a monopulse receiving antenna, the third and first ports of said first and third circulators being interconnected;

a microwave shorting impedance connected across the third port of said second circulator;

a microwave switch interconnecting the second ports of said first and second circulators;

a one-port super-regenerative microwave amplifier, the one port of said amplifier being operatively connected to a second port of said third circulator;

a microwave diode detector responsive to a third port of said third circulator for providing a video output;

a first and second boxcar detector;

video signal switching means for connecting the output of said microwave detector to alternate ones of said boxcar detectors in synchronism with the switching of said microwave switch;

signal combining means responsive to the outputs of said boxcar detectors for providing first and second video signals indicative of the sum thereof and difference therebetween, respectively; and means for operating said microwave switch, said synchronous switch and said superregenerative means in synchronism at a cyclical rate having a periodicity no greater than one-half the transmitted pulsewidth of said monopulse system, said super-regenerative means being operated in a logarithmic mode.

References Cited by the Examiner

UNITED STATES PATENTS

| | | | |
|---|---|---|---|
| 2,536,346 | 1/1951 | Bradley | 343—13.1 |
| 2,929,058 | 3/1960 | Blasberg et al. | 343—16.2 |
| 3,049,702 | 8/1962 | Schreitmueler | 343—16 |
| 3,112,482 | 11/1963 | Fiske | 343—16.2 |

CHESTER L. JUSTUS, *Primary Examiner.*